(12) United States Patent
Yamamoto

(10) Patent No.: US 7,359,126 B2
(45) Date of Patent: Apr. 15, 2008

(54) PROJECTION ZOOM LENS AND PROJECTION DISPLAY DEVICE WHICH USES SAME

(75) Inventor: Chikara Yamamoto, Kodaira (JP)

(73) Assignee: Fujinon Corporation, Saitama (JP)

(*) Notice: Subject to any disclaimer, the term of this patent is extended or adjusted under 35 U.S.C. 154(b) by 0 days.

(21) Appl. No.: 11/723,777

(22) Filed: Mar. 22, 2007

(65) Prior Publication Data
US 2007/0223103 A1    Sep. 27, 2007

(30) Foreign Application Priority Data
Mar. 22, 2006    (JP)    ............ 2006-078270

(51) Int. Cl.
*G02B 15/14* (2006.01)
(52) U.S. Cl. ............ 359/683; 359/687; 359/686
(58) Field of Classification Search ........... 359/683, 359/687, 686, 676, 677, 772, 771, 774
See application file for complete search history.

(56) References Cited

FOREIGN PATENT DOCUMENTS

| JP | 2004-117519 | 4/2004 |
|---|---|---|
| JP | 2005-62226 | 3/2005 |
| JP | 2005-257896 | 9/2005 |

*Primary Examiner*—Timothy Thompson
(74) *Attorney, Agent, or Firm*—Arnold International; Jon W. Henry; Bruce Y. Arnold

(57) ABSTRACT

A projection zoom lens includes six lens groups, four of which move along the optical axis during zooming. Of the lens groups that move during zooming, the one nearest the reducing side moves to a position closest to the enlarging side at an intermediate position of zooming between the wide-angle end and the telephoto end, and a lens group that does not move during zooming is located on the reducing side of the lens group nearest the reducing side that moves during zooming. The projection zoom lens satisfies specified conditions. From the enlarging side, the first lens group has negative refractive power while all the other lens groups except the fifth lens group are required to have positive refractive power. A projection display device is also disclosed.

20 Claims, 7 Drawing Sheets

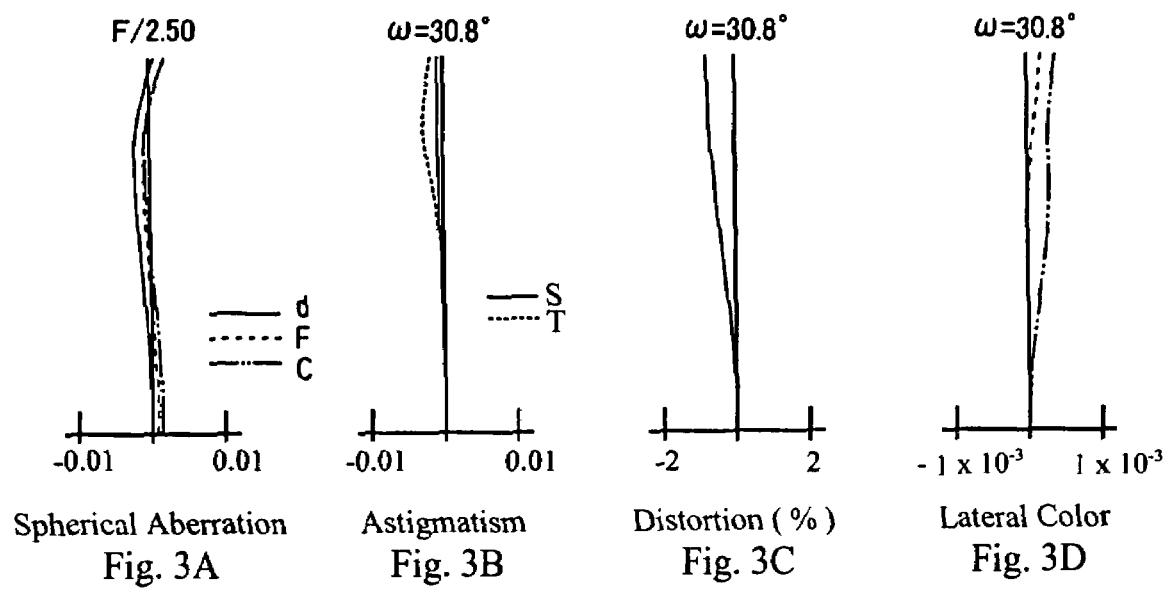
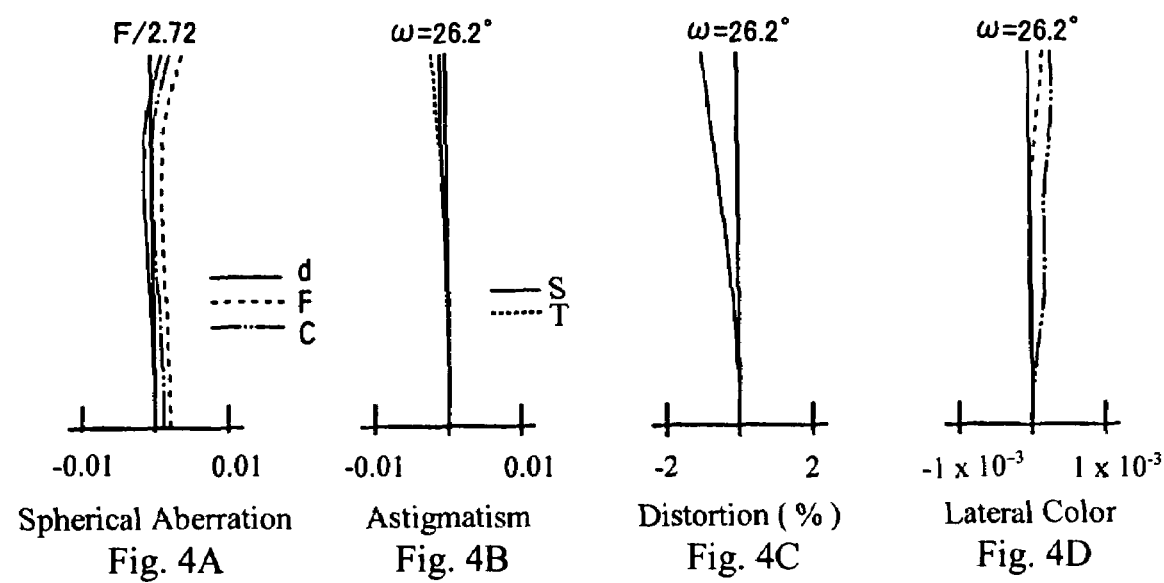

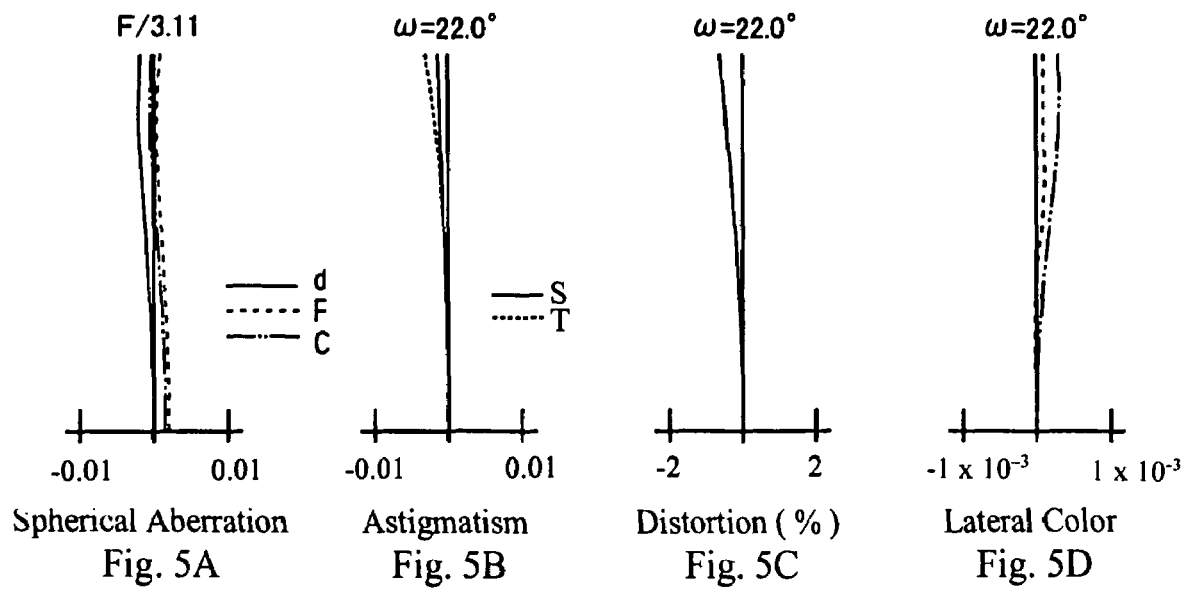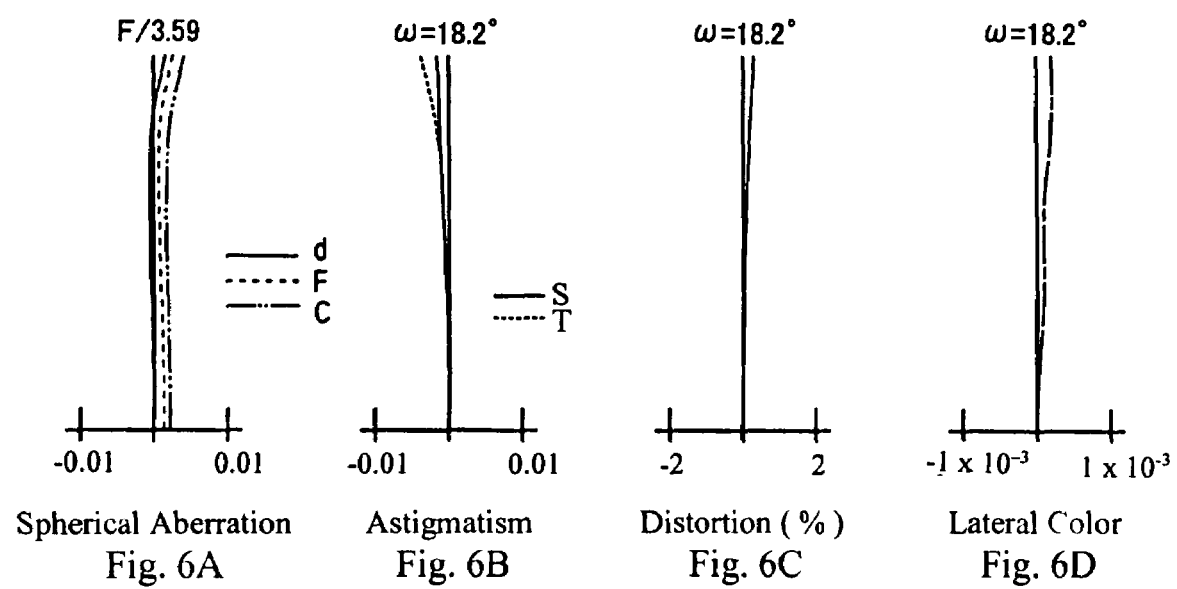

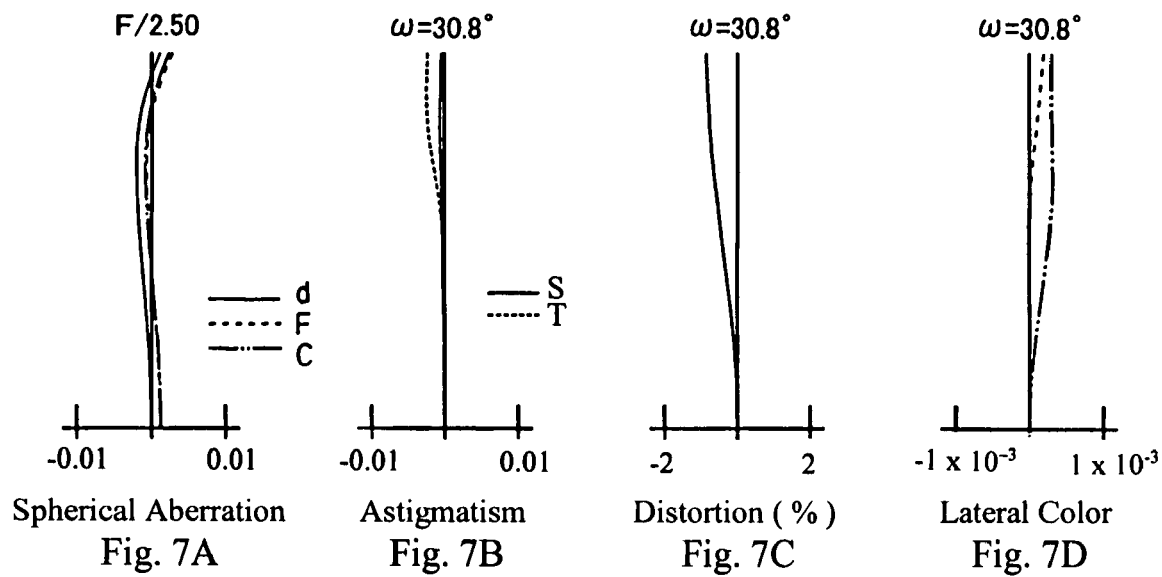
Fig. 7A Spherical Aberration
Fig. 7B Astigmatism
Fig. 7C Distortion (%)
Fig. 7D Lateral Color
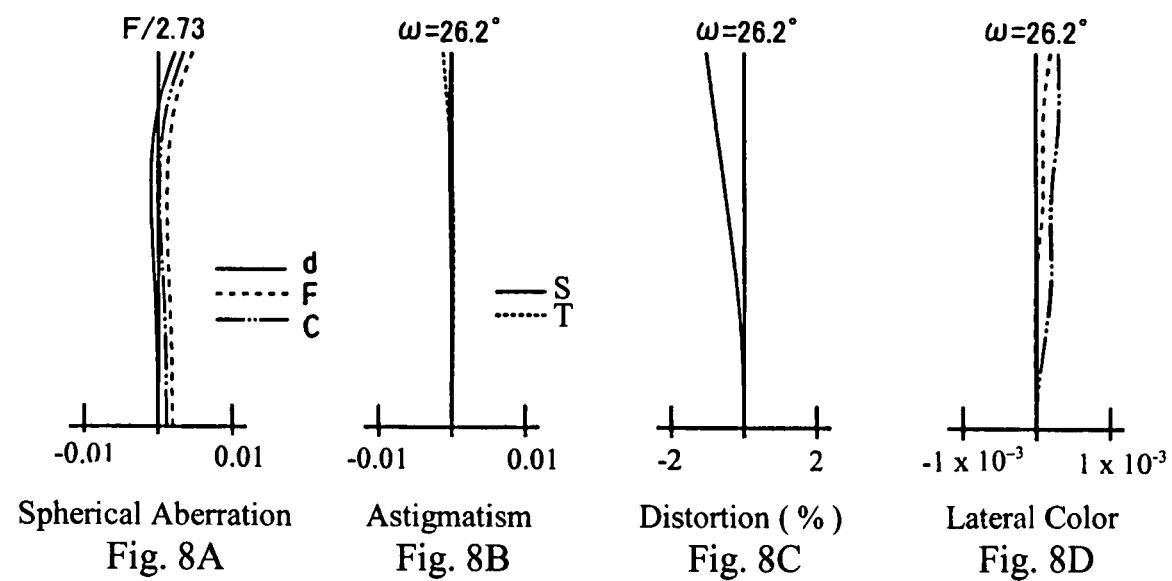
Fig. 8A Spherical Aberration
Fig. 8B Astigmatism
Fig. 8C Distortion (%)
Fig. 8D Lateral Color

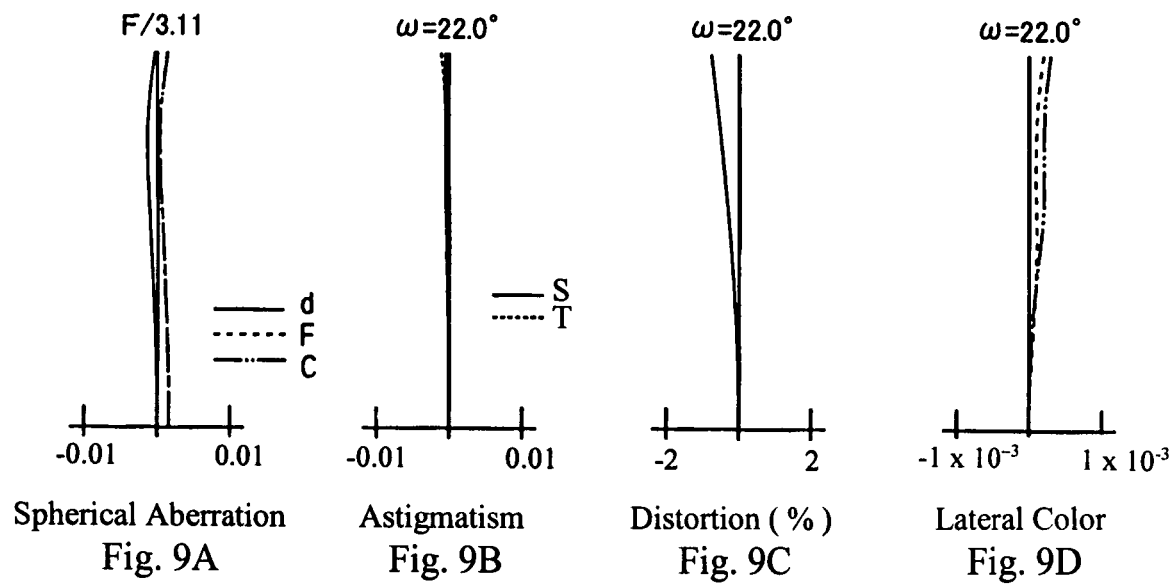
Fig. 9A Spherical Aberration
Fig. 9B Astigmatism
Fig. 9C Distortion (%)
Fig. 9D Lateral Color
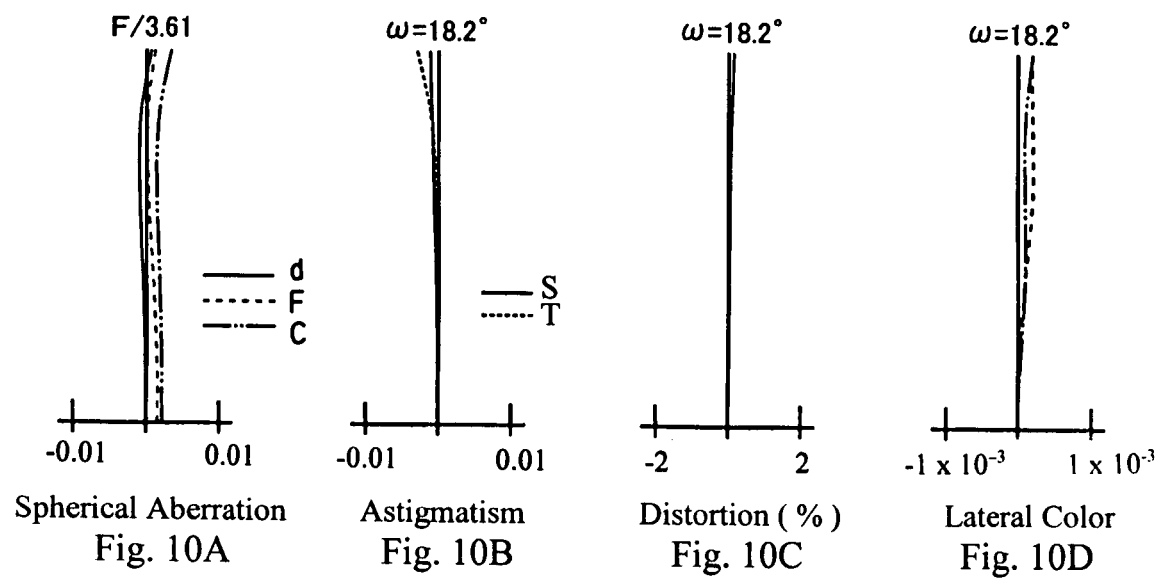
Fig. 10A Spherical Aberration
Fig. 10B Astigmatism
Fig. 10C Distortion (%)
Fig. 10D Lateral Color

PROJECTION ZOOM LENS AND PROJECTION DISPLAY DEVICE WHICH USES SAME

FIELD OF THE INVENTION

The present invention relates to a projection zoom lens that includes six lens groups for mounting in a projection display device and to a projection display device that includes such a projection zoom lens. Particularly, the present invention relates to a projection zoom lens and a projection display device using a projection zoom lens that enlarges and projects a light beam carrying image information from light valves of a liquid crystal display device, a DMD (Digital Micromirror Device) display device, or similar display device, onto a screen.

BACKGROUND OF THE INVENTION

Recently, transmission-type and reflection-type liquid crystal display devices, as well as projection display devices using light valves, such as DMD display devices, have become very popular and have become capable of high performance. There is a high demand for utilizing the performance capabilities of these display devices in projectors, including obtaining optical systems in these projectors that enable higher performance to be provided.

For example, a space for inserting a color synthesizing prism for synthesizing light beams from multiple light valves becomes necessary in an optical system using multiple light valves, which, in turn, makes a large back focus distance necessary. Moreover, there arises a need to further improve the image resolution performance of a projection lens. In particular, the deterioration of image resolution in a wide-angle lens due to chromatic aberrations when using projection display devices using light valves has become a problem due to rapid advances in miniaturizing the pixel size and in increasing the number of pixels in light valves.

Lenses described in Japanese Laid-Open Patent Applications 2004-117519 and 2005-62226 have been known as zoom lenses that can ensure a large back focus distance as mentioned above, but these zoom lenses have problems that limit the zoom ratio to values as small as about 1.2, thereby restricting the arrangements of projection display devices. Namely, projection spaces in which the projection display devices are used vary from wide to narrow, and therefore a zoom lens that has a zooming function for changing the magnification of the projected image according to the width of the projection space so as to provide more compatible arrangements has been desired. In this regard, at present, a zoom lens with a zoom ratio of about 1.5 is desired.

Accordingly, as described in Japanese Laid-Open Patent Application 2005-257896, a zoom lens for which the zoom ratio is large has been developed. However, while the zoom lens described in Japanese Laid-Open Patent Application 2005-257896 ensures a zoom ratio of about 1.5, it has a problem of providing a somewhat too-short back focus distance, at least when desiring to insert a large color synthesizing prism.

Also, with the use of high resolution light valves, there are problems in sufficiently correcting the field curvature and chromatic aberrations.

BRIEF SUMMARY OF THE INVENTION

The present invention relates to a projection zoom lens and a projection display device that can ensure a large back focus distance and that can improve correction of aberrations, particularly field curvature and lateral color, under conditions that ensure a zoom ratio of about 1.5 or higher.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 3A-3D show aberrations of the projection zoom lens of Embodiment 1 at the wide-angle end;

FIGS. 4A-4D show aberrations of the projection zoom lens of Embodiment 1 at the zoom ratio of 1.215;

FIGS. 5A-5D show aberrations of the projection zoom lens of Embodiment 1 at a zoom ratio of 1.480;

FIGS. 6A-6D show aberrations of the projection zoom lens of Embodiment 1 at the telephoto end;

FIGS. 7A-7D show aberrations of the projection zoom lens of Embodiment 2 at the wide-angle end;

FIGS. 8A-8D show aberrations of the projection zoom lens of Embodiment 2 at the zoom ratio of 1.215;

FIGS. 9A-9D show aberrations of the projection zoom lens of Embodiment 2 at the zoom ratio of 1.480;

FIGS. 10A-10D show aberrations of the projection zoom lens of Embodiment 2 at the telephoto end.

DETAILED DESCRIPTION

Figure 1:
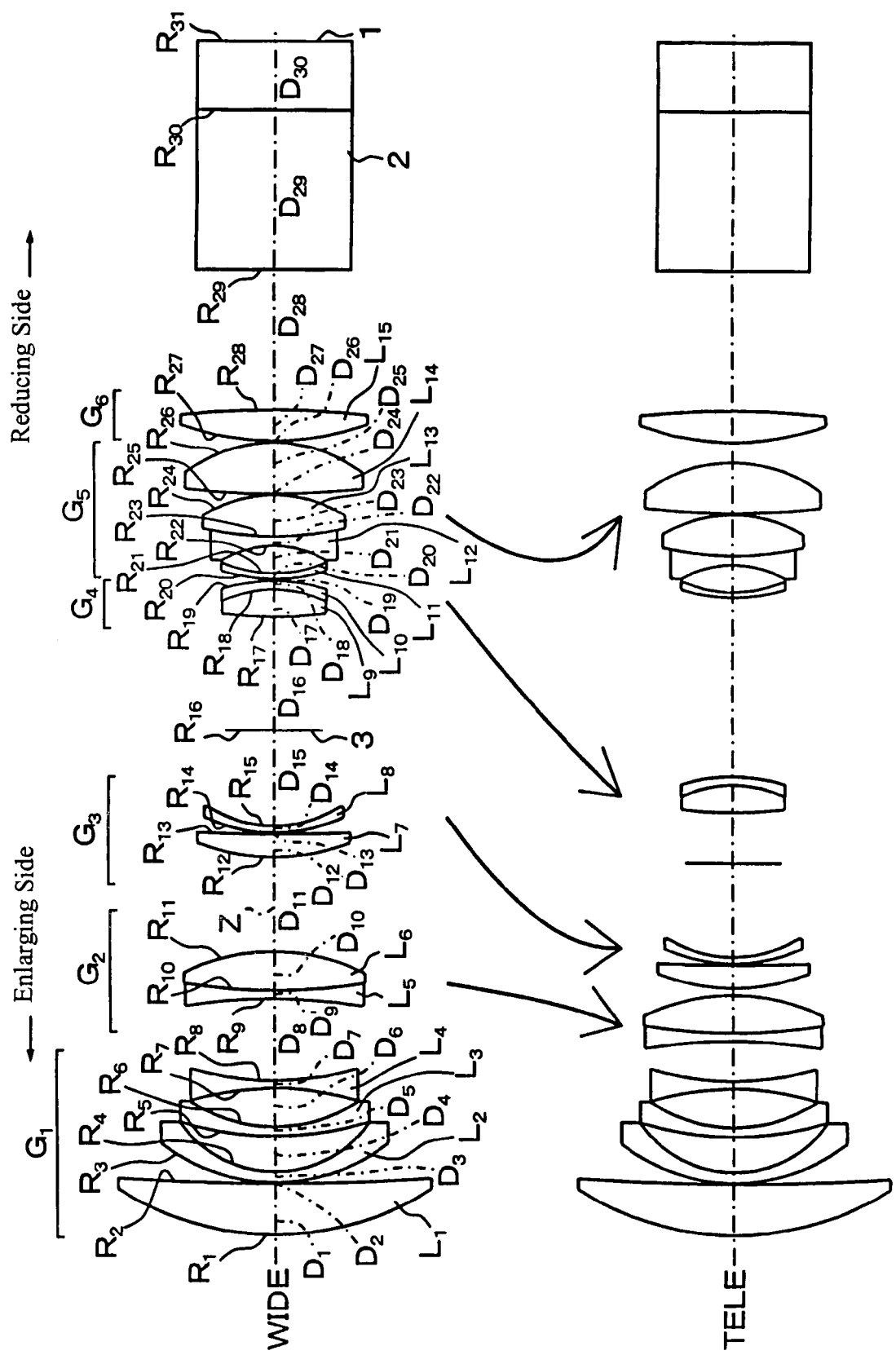
FIG. 1 shows cross-sectional views of the projection zoom lens of Embodiment 1 at the wide-angle end (WIDE) and the telephoto end (TELE)
Figure 2:
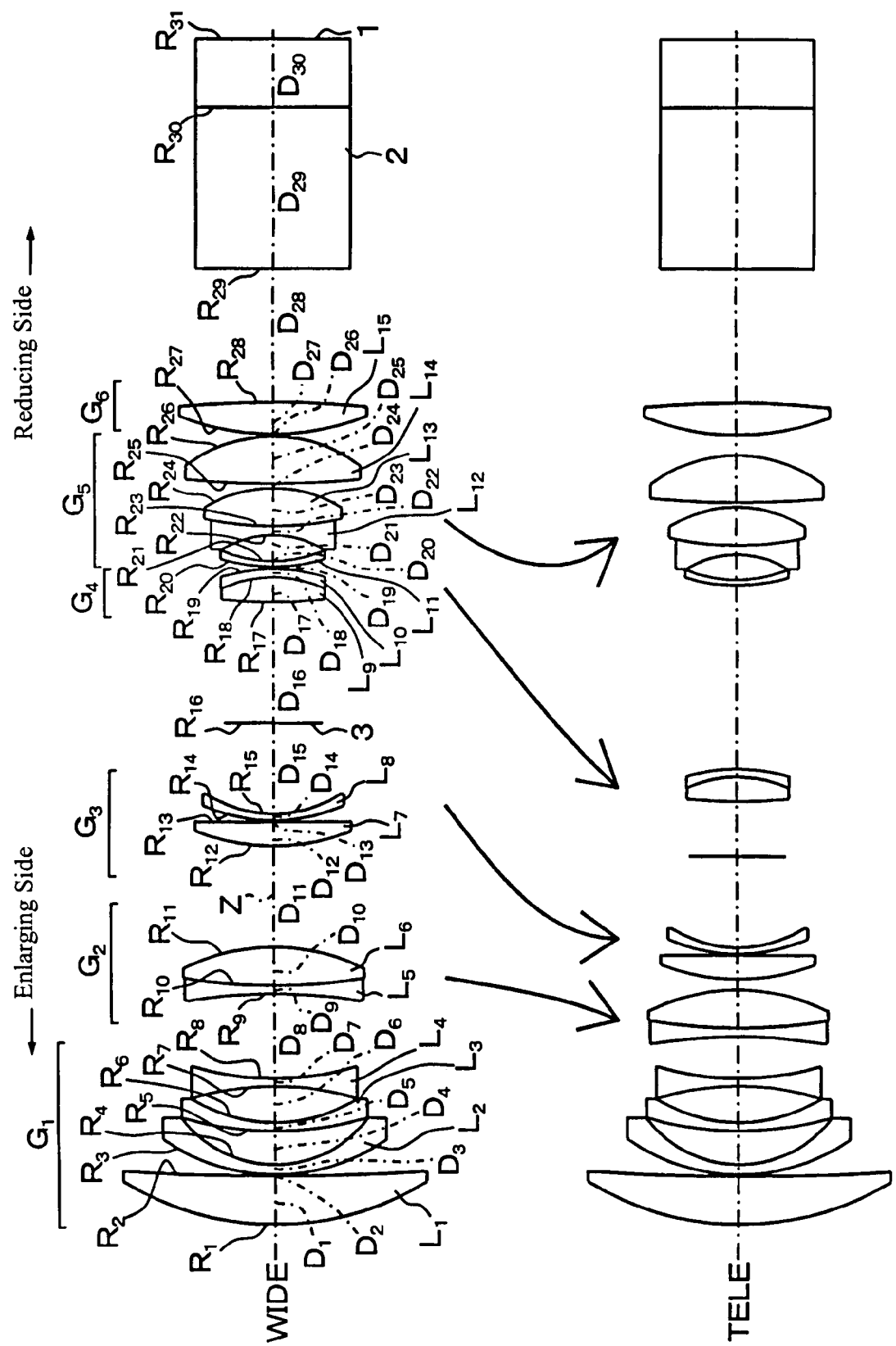
FIG. 2 shows cross-sectional views of the projection zoom lens of Embodiment 2 at the wide-angle end (WIDE) and the telephoto end (TELE)

A general description of the preferred embodiments of the projection zoom lens of the present invention will now be described with reference to FIG. 1 that shows Embodiment 1 at the wide-angle end (WIDE) and the telephoto end (TELE). In FIG. 1, lens groups are referenced by the letter G followed by a number denoting their order from the enlarging side of the projection zoom lens, from $G_1$ to $G_6$, along the optical axis Z, and the optical components belonging to each of these lens groups are indicated by brackets below the labels $G_1$ to $G_6$. Downwardly directed arrows between the wide-angle end (WIDE) and the telephoto end (TELE) configurations shown in FIG. 1 indicate the movements of lens groups $G_2$ to $G_5$ during zooming from the wide-angle end to the telephoto end. Lens elements are referenced by the letter L followed by a number denoting their order from the enlarging side of the projection zoom lens, from $L_1$ to $L_{15}$ for Embodiments 1 and 2 that follow. In Embodiments 1 and 2, as shown in FIGS. 1 and 2, an upper left arrow points toward the enlarging side and an upper right arrow points toward the reducing side. In FIGS. 1 and 2, reference numeral 2 denotes a cover glass that may include a filter. Reference numeral 1 denotes a display surface (usually planar) of a light valve, such as a DMD or transmission-type or reflection-type liquid crystal display panel (hereinafter display surface 1). Radii of curvature of the optical surfaces of all the optical elements are referenced by the letter R followed by a number denoting their order from the enlarging side of the projection zoom lens, from $R_1$ to $R_{31}$ in FIG. 1 and FIG. 2. The on-axis surface spacings along the optical axis Z of all the optical element surfaces are referenced by the letter D followed by a number denoting their order from the enlarging side of the projection zoom lens, from $D_1$ to $D_{30}$ in FIG. 1 and FIG. 2.

The term "lens group" is defined in terms of "lens elements" and "lens components" as explained herein. The term "lens element" is herein defined as a single transparent mass of refractive material having two opposed refracting surfaces, which surfaces are positioned at least generally transversely of the optical axis of the projection zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

The term "lens group" is used herein to define an assembly of one or more lens components in optical series and with no intervening lens components along an optical axis that during zooming is movable as a single unit relative to other lens components. Thus, for example, in a zoom lens, a lens group may be stationary or movable with respect to an image plane of the lens group, and stationary lens elements of the zoom lens may define different lens groups based on those different lens groups being separated by lens groups that move relative to those different lens groups and the image plane. More specifically as an example, a lens group at the enlarging end and a lens group at the reducing end of a zoom lens may be stationary, but they are not part of the same lens group because they are separated by other lens components that belong to other lens groups.

The projection zoom lens of the present invention includes at least three lens groups arranged from the enlarging side along an optical axis, at least two of which move along the optical axis during zooming. Of the moving lens groups, the one nearest the reducing side (lens group $G_5$ in FIG. 1) moves nearest the enlarging side at the intermediate position of zooming between the wide-angle end and the telephoto end. Additionally, in the projection zoom lens of the present invention, a lens group that does not move during zooming may be located on the reducing side of the lens group nearest the reducing side that moves during zooming, and the following conditions are satisfied:

$2.2 \leq bf/fw \leq 5.0$  Condition (1)

$1.5 \leq ft/fw$  Condition (2)

$55 \leq vdA$  Condition (3)

$10 < |fr/dd|$  Condition (4)

where bf is the air-equivalent distance along the optical axis between the lens surface on the reducing side of the projection zoom lens and the image plane of the projection zoom lens;

fw is the focal length of the projection zoom lens at the wide-angle end;

ft is the focal length of the projection zoom lens at the telephoto end;

vdA is determined as follows:

(a) if a lens group that does not move during zooming is located on the reducing side of the lens group nearest the reducing side that moves during zooming, then vdA is the average value of the Abbe number(s) of the lens element(s) having positive refractive power, among the lens groups that move during zooming, of the lens group that is nearest the reducing side, and the Abbe number(s) of the lens element(s) having positive refractive power of the lens group that does not move during zooming that is located on the reducing side of the lens group that moves during zooming that is nearest the reducing side; or (b) if a lens group that does not move during zooming is not located on the reducing side of the lens group nearest the reducing side that moves during zooming, then vdA is the average value of the Abbe number(s) of the lens element(s) having positive refractive power, among the lens groups that move during zooming, of the lens group that is nearest the reducing side;

fr is the focal length of the lens group that moves during zooming that is nearest the reducing side; and dd is the distance along the optical axis between the positions at the wide-angle end and at the telephoto end of the lens group that moves during zooming that is nearest the reducing side Condition (1) above controls the back focus distance. If the lower limit of Condition (1) above is not satisfied, it becomes difficult to insert a color synthesizing optical system, such as a color synthesizing prism, between the projection zoom lens and the light valves. On the other hand, if the upper limit of Condition (1) above is not satisfied, the lens system becomes too large. By satisfying Condition (1), a large back focus distance can be ensured.

Condition (2) above controls the zoom ratio, that is, the ratio of the focal length of the projection zoom lens at the telephoto end divided by the focal length of the projection zoom lens at the wide-angle end. If Condition (2) above is not satisfied, it becomes difficult to provide compatible arrangements of the projection zoom lens. By satisfying Condition (2) above, a zoom ratio of 1.5 or higher may be ensured. Both Conditions (1) and (2) above contribute to achieving compatible arrangements.

Condition (3) above controls the average value of the Abbe numbers of the lens elements having positive refractive power of the one lens group that moves during zooming that is nearest the reducing side (lens group $G_5$ of FIG. 1) and the lens group (lens group $G_6$ of FIG. 1) that does not move during zooming that is located on the reducing side of the one lens group that moves during zooming that is nearest the reducing side. If Condition (3) above is not satisfied, the lateral color becomes too large and too difficult to correct.

Condition (4) above controls the ratio of the focal length of the one lens group that moves during zooming that is nearest the reducing side (lens group $G_5$ of FIG. 1) divided by the distance along the optical axis between the positions of this same lens group at the wide-angle end and at the telephoto end. If Condition (4) above is not satisfied, it becomes difficult to adequately correct lateral color over the entire range of zoom.

In the projection zoom lens of the present invention, it is preferable that the projection zoom lens be formed of six lens groups, four of which move along the optical axis during zooming, as shown in FIG. 1.

As recited above, the lens group ($G_5$ in FIG. 1) that moves during zooming that is nearest the reducing side moves nearest the enlarging side at the intermediate position of zooming between the wide-angle end and the telephoto end. If the zoom ratio is large, the displacement of the lens groups tends to increase. Particularly, if the displacement of the lens groups on the reducing side is large, the balance in lateral color and distortion at the wide-angle end and the telephoto end deteriorates. However, according to the present invention, at least the moving lens group nearest the reducing side, as described above, is constructed so that its moving range over the entire zoom region is reduced by having its closest position to the enlarging side be at the intermediate position of zooming between the wide-angle end and the telephoto end so that problems of deterioration of the balance in lateral color and distortion at the wide-angle end and the telephoto end do not arise.

In the preferable projection zoom lens of the present invention that is formed of six lens groups, four of which move during zooming, it is also preferable that the lens groups be arranged in order from the enlarging side, as follows: a first lens group having negative refractive power and that does not move along the optical axis during zooming; a second lens group having positive refractive power; a third lens group having positive refractive power; a fourth lens group having positive refractive power; a fifth lens group; and a sixth lens group having positive refractive power and that does not move along the optical axis during zooming. In FIG. 1, the first through sixth lens groups are labeled $G_1$, $G_2$, $G_3$, $G_4$, $G_5$, and $G_6$, respectively, and lens group $G_5$ has negative refractive power. Lens groups $G_2$, $G_3$, $G_4$, and $G_5$ move during zooming.

In the projection zoom lens of the present invention, it is further preferable that the following condition be satisfied:

$$55 \leq vdP \qquad \text{Condition (5)}$$

where vdP is determined as follows:
(a) if a lens group that does not move during zooming is located on the reducing side of the lens group nearest the reducing side that moves during zooming, then vdP is the Abbe number of each of the lens element(s) having positive refractive power of the lens group that moves during zooming that is nearest the reducing side, and the Abbe number of each of the lens element(s) having positive refractive power of the lens group that does not move during zooming that is located on the reducing side of the lens group that moves during zooming that is nearest the reducing side; or
(b) if a lens group that does not move during zooming is not located on the reducing side of the lens group nearest the reducing side that moves during zooming, then vdP is the Abbe number of each of the lens element(s) having positive refractive power of the lens group that moves during zooming that is nearest the reducing side.

Condition (5) above controls the Abbe numbers of the lens elements having positive refractive power of the one lens group that moves during zooming that is nearest the reducing side (lens group $G_5$ of FIG. 1) and the lens group that does not move during zooming that is located on the reducing side of the one lens group that moves during zooming that is nearest the reducing side (lens group $G_6$ of FIG. 1). If Condition (5) above is not satisfied, the lateral color becomes too large and too difficult to correct.

Additionally, in the projection zoom lens of the present invention, it is preferable that the following condition be satisfied:

$$50 < |fr/dd| \qquad \text{Condition (6)}$$

where fr and dd are as defined above with regard to similar Condition (4).

Condition (6) above is the same as Condition (4) above except that Condition (6) has a larger lower limit than Condition (4) and similarly provides for correction of lateral color over the entire range of zoom.

As shown in FIG. 1, the projection zoom lens includes a mask 3 on the reducing side of the third lens group $G_3$ for cutting off peripheral light rays. The arrangement is such that the projection zoom lens is telecentric or nearly telecentric throughout the zoom range, which is a preferable feature of the present invention. The phrase "nearly telecentric" means that slight variations from exact telecentricity may occur at various image heights at some zoom settings but that the variations remain small in comparison to comparable prior zoom lenses that do not include telecentricity in their design criteria. Variations of the mask 3 are possible, such as using a so-called variable stop with a variable aperture diameter in place of a so-called fixed stop with a fixed aperture diameter. Also, the mask 3 may be movable along the optical axis with the movement being integral with or independent of zoom movement of one of the lens groups that move during zooming. The arrangement position of mask 3 is not limited to a position between the third lens group $G_3$ and the fourth lens group $G_4$, as shown in FIG. 1, and the mask 3 may be arranged at various other positions. Additionally, the number of masks used can be increased to two or more.

As shown in FIG. 1, the first lens group $G_1$ includes, arranged in order along the optical axis from the enlarging side, a first lens element $L_1$ having positive refractive power, a second lens element $L_2$ having negative refractive power and a meniscus shape with its convex surface on the enlarging side, a third lens element $L_3$ having negative refractive power, and a fourth lens element $L_4$ having negative refractive power. The second lens group $G_2$ is formed as a cemented lens component made by cementing a fifth lens element $L_5$ having negative refractive power and a sixth lens element $L_6$ having positive refractive power, arranged in this order from the enlarging side. The third lens group $G_3$ is formed as a seventh lens element $L_7$ having positive refractive power and an eighth lens element $L_8$ having negative refractive power and a meniscus shape, arranged in this order from the enlarging side. The fourth lens group $G_4$ is formed as a cemented lens component made by cementing a biconvex ninth lens element $L_9$ and a tenth lens element $L_{10}$ having negative refractive power and a meniscus shape, arranged in this order from the enlarging side. The fifth lens group $G_5$ is formed of, in order from the enlarging side, an eleventh lens element $L_{11}$ having negative refractive power and a meniscus shape with its convex surface on the enlarging side, a cemented lens component formed by cementing a twelfth lens element $L_{12}$ having negative refractive power and a concave surface on the enlarging side to a thirteenth lens element $L_{13}$ having positive refractive power and a convex surface on the reducing side, and a fourteenth lens element $L_{14}$ having positive refractive power. The sixth lens group may be formed of, for example, a biconvex lens element $L_{15}$.

The lens elements of the above lens groups are not limited to those mentioned above, and the number of lens elements having either positive refractive power or negative refractive power can be increased or decreased by one or more.

As described above, the projection zoom lens of the present invention provides a wide-angle field of view and ensures a sufficiently large back focus distance based on the arrangement of lens elements having positive and negative refractive powers on the enlarging end of the projection zoom lens.

The projection zoom lens of the present invention performs a zooming function by moving four lens groups, namely, the second lens group $G_2$ through the fifth lens group $G_5$ as illustrated in FIG. 1. The projection zoom lens includes six lens groups, four of which move independently during zooming in order to divide the required zooming function among the four moving lens groups, thereby enabling the optical performance to be improved and the variation of f-number with the zooming to be inhibited.

As is evident from the loci of the lens groups that move during zooming shown in FIG. 1, three lens groups (namely, the second lens group $G_2$ through the fourth lens group $G_4$) move monotonically toward the enlarging side when zooming from the wide-angle end to the telephoto end.

On the other hand, the zoom lens is constructed so that, among the lens groups that move during zooming, the one nearest the reducing side (i.e., lens group $G_5$) is positioned closest to the enlarging side at the intermediate position of zooming between the wide-angle end and the telephoto end. Such a construction enables the range of movement of this moving lens group to be reduced, which assists in balancing aberrations such as lateral color and distortion at the wide-angle end and at the telephoto end.

In the projection zoom lens of the present invention, the power arrangement of the various lens groups and the movements of the various moving lens groups can be varied. For example, the fifth lens group $G_5$ may have positive or negative refractive power. However, the number of lens groups that move during zooming is at least two.

Next, the projection display device of the present invention will be briefly described. The projection display device of the present invention is one wherein a light source, light valve, an illumination optical system that guides a light beam from the light source to the light valve, and a projection zoom lens, as variously described above, are arranged so that the light beam is photo-modulated by the light valve and projected onto a screen by the projection zoom lens. An example of a projection display device in which a projection zoom lens of the present invention may be used is shown schematically in FIG. 11.

Figure 11:
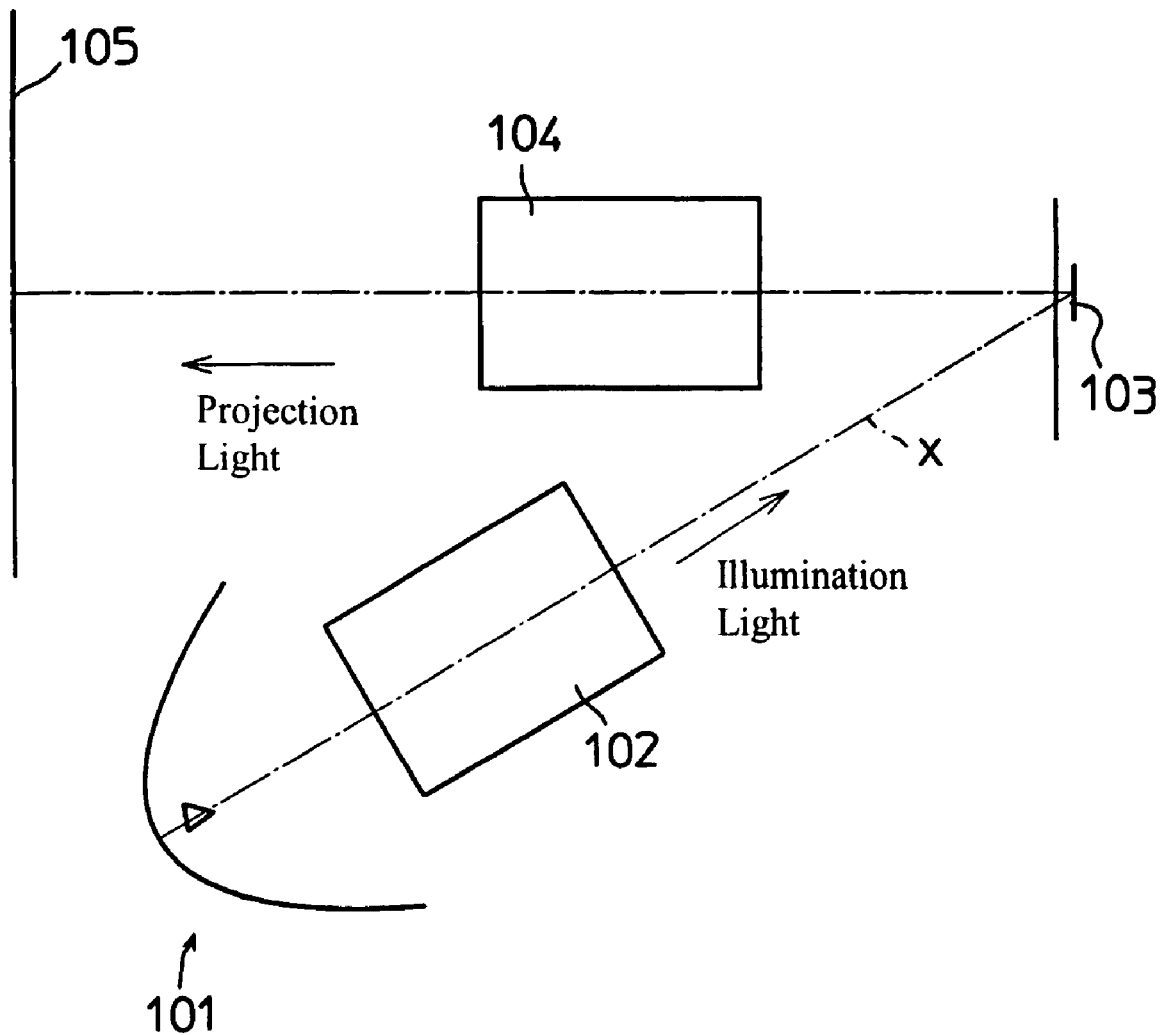
FIG. 11 shows a schematic representation of a projection display device in which a projection zoom lens of the present invention may be used.

As shown in FIG. 11, the projection display device includes a light source 101 that projects a light beam that is selectively converted in a time series to each of the three primary colors, red (R), green (G), and blue (B), by a color wheel (not shown in FIG. 11). Homogenization of the light quantity distribution in a cross-section perpendicular to the optical axis X of the light beam is achieved by an illumination optical system 102, and the homogenized light beam is irradiated on a display plane 103 of a DMD. A modulation switching for the different colors is performed in accordance with the change-over of colors of the incident light at this display plane 103, and the projection light properly modulated by the display plane 103 enters the projection zoom lens 104 and is projected onto a screen 105.

The projection display device shown in FIG. 11 may be changed in various ways in accordance with the present invention. For example, the modulation of R, G, and B colors may also be simultaneously performed by three DMDs corresponding to light beams of different colors. In this case, a color separation/synthesis prism (not shown in FIG. 11) would be arranged between the projection zoom lens 104 and the display plane 103.

Embodiments 1 and 2 of the projection zoom lens of the present invention will now be individually described with reference to the drawings.

Embodiment 1

FIG. 1 shows the basic lens element configuration of the six-group projection zoom lens of Embodiment 1. From the enlarging side, the first lens group $G_1$ has negative refractive power, the second, third, and fourth lens groups, $G_2$, $G_3$, and $G_4$, have positive refractive power, the fifth lens group $G_5$ has negative refractive power, and the sixth lens group $G_6$ has positive refractive power.

As shown in FIG. 1, the first lens group $G_1$ includes, arranged in order along the optical axis from the enlarging side, a first lens element $L_1$ having positive refractive power and a meniscus shape with its convex surface on the enlarging side, a second lens element $L_2$ having negative refractive power and a meniscus shape with its convex surface on the enlarging side, a third lens element $L_3$ having negative refractive power and a meniscus shape with its convex surface on the enlarging side, and a biconcave fourth lens element $L_4$. The second lens group $G_2$ is formed as a cemented lens component made by cementing a biconcave fifth lens element $L_5$ and a biconvex sixth lens element $L_6$, arranged in this order from the enlarging side. The third lens group $G_3$ is formed as a seventh lens element $L_7$ having positive refractive power and a meniscus shape with its convex surface on the enlarging side and an eighth lens element $L_8$ having negative refractive power and a meniscus shape with its convex surface on the enlarging side, arranged in this order from the enlarging side. The fourth lens group $G_4$ is formed as a cemented lens component made by cementing a biconvex ninth lens element $L_9$ and a tenth lens element $L_{10}$ having negative refractive power and a meniscus shape with its concave surface on the enlarging side, in this order from the enlarging side. The fifth lens group $G_5$ is formed of, in order from the enlarging side, an eleventh lens element $L_{11}$ having negative refractive power and a meniscus shape with its convex surface on the enlarging side, a cemented lens component formed by cementing a biconcave twelfth lens element $L_{12}$ and a biconvex thirteenth lens element $L_{13}$, and a biconvex fourteenth lens element $L_{14}$. The sixth lens group $G_6$ is formed of a biconvex fifteenth lens element $L_{15}$.

Table 1 below lists the surface number #, in order from the enlarging side, the radius of curvature R of each surface, the on-axis surface spacing D, as well as the refractive index $N_d$ and the Abbe number $v_d$ (both at the d-line) of each optical element for Embodiment 1. The numerical values of R and D are based on a normalized focal length of unity at the wide-angle end configuration of the zoom lens of Embodiment 1 when focused at infinity.

TABLE 1

| # | R | D | $N_d$ | $v_d$ |
|---|---|---|---|---|
| 1 | 2.8184 | 0.4815 | 1.48749 | 70.2 |
| 2 | 21.9359 | 0.0108 | | |
| 3 | 1.7871 | 0.0998 | 1.65160 | 58.5 |
| 4 | 1.1312 | 0.3322 | | |
| 5 | 3.1730 | 0.0836 | 1.71300 | 53.9 |
| 6 | 1.4978 | 0.3582 | | |
| 7 | -2.7632 | 0.0728 | 1.80809 | 22.8 |
| 8 | 2.7632 | $D_8$ (variable) | | |
| 9 | -5.3595 | 0.0809 | 1.79952 | 42.2 |
| 10 | 5.3595 | 0.3626 | 1.69895 | 30.1 |
| 11 | -1.9863 | $D_{11}$ (variable) | | |
| 12 | 2.0543 | 0.2122 | 1.67270 | 32.1 |
| 13 | 18.5933 | 0.0108 | | |
| 14 | 1.6113 | 0.0621 | 1.61800 | 63.4 |
| 15 | 1.2086 | 0.8904 | | |
| 16 (mask) | ∞ | $D_{16}$ (variable) | | |
| 17 | 4.5128 | 0.2562 | 1.43875 | 95.0 |
| 18 | -1.1867 | 0.0810 | 1.60562 | 43.7 |
| 19 | -1.6920 | $D_{19}$ (variable) | | |
| 20 | 1.7595 | 0.0512 | 1.80610 | 33.3 |
| 21 | 1.2659 | 0.2582 | | |
| 22 | -1.0060 | 0.0864 | 1.78800 | 47.4 |
| 23 | 3.0168 | 0.3832 | 1.43875 | 95.0 |
| 24 | -1.3280 | 0.0109 | | |
| 25 | 7.6430 | 0.4686 | 1.49700 | 81.6 |
| 26 | -1.4602 | $D_{26}$ (variable) | | |
| 27 | 2.7022 | 0.2950 | 1.43875 | 95.0 |
| 28 | -8.0474 | 1.3059 | | |
| 29 | ∞ | 1.4948 | 1.51633 | 64.1 |
| 30 | ∞ | 0.6475 | 1.83500 | 43.0 |
| 31 | ∞ | | | |

In the zoom lens of Embodiment 1, lens groups $G_2$, $G_3$, $G_4$ and $G_5$ move during zooming. Therefore, the values of the on-axis spacings $D_8$, $D_{11}$, $D_{16}$, $D_{19}$, and $D_{26}$ vary.

Table 2 below lists the values of the variables $D_8$, $D_{11}$, $D_{16}$, $D_{19}$ and $D_{26}$ (i.e., the group spacings) at focal lengths of 1.000 (wide-angle end), 1.215, 1.480, and 1.800 (telephoto end).

TABLE 2

| Focal Length | $D_8$ | $D_{11}$ | $D_{16}$ | $D_{19}$ | $D_{26}$ |
|---|---|---|---|---|---|
| 1.000 | 0.7721 | 0.8993 | 1.0828 | 0.0214 | 0.0162 |
| 1.215 | 0.6748 | 0.3278 | 1.0783 | 0.3710 | 0.3396 |
| 1.480 | 0.5532 | 0.0160 | 0.8846 | 0.9149 | 0.4228 |
| 1.800 | 0.3740 | 0.0707 | 0.4719 | 1.6926 | 0.1823 |

In the projection zoom lens of Embodiment 1, the back focus distance is 2.7, and the zoom ratio is 1.8, as indicated in Table 3 below. Also as set forth in Table 3 below, the zoom lens of Embodiment 1 satisfies all of Conditions (1) through (6) above based on a normalized focal length of the zoom lens being unity at the wide-angle end.

TABLE 3

| Condition No. | Condition | Value |
|---|---|---|
| (1) | $2.2 \leq bf/fw \leq 5.0$ | 2.7 |
| (2) | $1.5 \leq ft/fw$ | 1.8 |
| (3) | $55 \leq vdA$ | 91 |
| (4), (6) | $10 < |fr/dd|$, $50 < |fr/dd|$ | 195 |
| (5) | $55 \leq vdP$ | 95.0, 81.6 |

FIGS. 3A-3D show the spherical aberration, astigmatism, distortion, and lateral color, respectively, of the projection zoom lens of Embodiment 1 at the wide-angle end. FIGS. 4A-4D show the spherical aberration, astigmatism, distortion, and lateral color, respectively, of the projection zoom lens of Embodiment 1 at the zoom ratio of 1.215. FIGS. 5A-5D show the spherical aberration, astigmatism, distortion, and lateral color, respectively, of the projection zoom lens of Embodiment 1 at the zoom ratio of 1.480. FIGS. 6A-6D show the spherical aberration, astigmatism, distortion, and lateral color, respectively, of the projection zoom lens of Embodiment 1 at the telephoto end. As shown in these figures, the f-number varies with the zoom ratio from F/2.50 in FIG. 3A to F/3.59 in FIG. 6A and the half-field angle ω varies with the zoom ratio from 30.8° in FIGS. 3B-3D to 18.2° in FIGS. 6B-6D. In FIGS. 3A, 4A, 5A, and 6A, the spherical aberration is shown for the wavelengths 587.6 nm (the d-line), 486.1 nm (the F-line), and 656.3 nm (the C-line). In FIGS. 3B, 4B, 5B, and 6B, the astigmatism is shown for both the sagittal image surface S and the tangential image surface T. In FIGS. 3C, 4C, 5C, and 6C, distortion is measured at 587.6 nm (the d-line). In FIGS. 3D, 4D, 5D, and 6D, the lateral color is shown for the wavelengths 486.1 nm (the F-line) and 656.3 nm (the C-line) relative to 587.6 nm (the d-line). Unless otherwise noted, the aberrations are in mm.

As is evident from FIGS. 3A-6D, the projection zoom lens of Embodiment 1 enables favorable correction of aberrations, with especially excellent correction of lateral color and field curvature. In Embodiment 1, distortion is corrected to two percent or less, thereby enabling satisfactory use of Embodiment 1 as a projection zoom lens.

Moreover, the projection zoom lens of Embodiment 1 enables improved optical performance to be achieved while ensuring a large back focus distance and a high zoom ratio.

Embodiment 2

FIG. 2 shows the basic lens element configuration of the zoom lens of Embodiment 2. Embodiment 2 is very similar to Embodiment 1 and therefore a separate description of Embodiment 2 will not be given. Embodiment 2 differs from Embodiment 1 in its lens elements configuration by different radii of curvature of the lens surfaces, some different optical element surface spacings, and some different indexes of refraction and Abbe numbers of the lens element materials.

Table 4 below lists the surface number #, in order from the enlarging side, the radius of curvature R of each surface, the on-axis surface spacing D, as well as the refractive index $N_d$ and the Abbe number $v_d$ (both at the d-line) of each optical element for Embodiment 2. The numerical values of R and D are based on a normalized focal length being unity at the wide-angle end configuration of the zoom lens of Embodiment 2 when focused at infinity.

TABLE 4

| # | R | D | $N_d$ | $v_d$ |
|---|---|---|---|---|
| 1 | 2.9084 | 0.4547 | 1.48749 | 70.2 |
| 2 | 24.3227 | 0.0108 | | |
| 3 | 1.8843 | 0.0998 | 1.65160 | 58.5 |
| 4 | 1.1391 | 0.3231 | | |
| 5 | 3.1828 | 0.0836 | 1.67790 | 55.3 |
| 6 | 1.5195 | 0.3542 | | |
| 7 | -2.7788 | 0.0728 | 1.80809 | 22.8 |
| 8 | 2.7788 | $D_8$ (variable) | | |
| 9 | -5.4125 | 0.0809 | 1.78800 | 47.4 |
| 10 | 5.4125 | 0.3663 | 1.68893 | 31.1 |
| 11 | -2.0089 | $D_{11}$ (variable) | | |
| 12 | 2.1010 | 0.2282 | 1.62004 | 36.3 |
| 13 | 149.0993 | 0.0108 | | |

TABLE 4-continued

| # | R | D | $N_d$ | $\nu_d$ |
|---|---|---|---|---|
| 14 | 1.6828 | 0.0620 | 1.43875 | 95.0 |
| 15 | 1.2054 | 0.8740 | | |
| 16 (mask) | ∞ | $D_{16}$ (variable) | | |
| 17 | 5.1273 | 0.2369 | 1.43875 | 95.0 |
| 18 | −1.2416 | 0.0809 | 1.60562 | 43.7 |
| 19 | −1.7591 | $D_{19}$ (variable) | | |
| 20 | 1.8161 | 0.0512 | 1.80610 | 33.3 |
| 21 | 1.3077 | 0.2401 | | |
| 22 | −1.0072 | 0.0863 | 1.80400 | 46.6 |
| 23 | 3.1439 | 0.3611 | 1.43875 | 95.0 |
| 24 | −1.2926 | 0.0431 | | |
| 25 | 9.0998 | 0.4525 | 1.49700 | 81.6 |
| 26 | −1.4281 | $D_{26}$ (variable) | | |
| 27 | 2.5198 | 0.3002 | 1.43875 | 95.0 |
| 28 | −10.0867 | 1.2732 | | |
| 29 | ∞ | 1.5268 | 1.51633 | 64.1 |
| 30 | ∞ | 0.6474 | 1.83500 | 43.0 |
| 31 | ∞ | | | |

In the zoom lens of Embodiment 2, lens groups $G_2$, $G_3$, $G_4$ and $G_5$ move during zooming. Therefore, the values of the on-axis spacings $D_8$, $D_{11}$, $D_{16}$, $D_{19}$, and $D_{26}$ vary.

Table 5 below lists the values of the variables $D_8$, $D_{11}$, $D_{16}$, $D_{19}$ and $D_{26}$ (i.e., the group spacings) at focal lengths of 1.000 (wide-angle end), 1.215, 1.480, and 1.800 (telephoto end).

TABLE 5

| Focal Length | $D_8$ | $D_{11}$ | $D_{16}$ | $D_{19}$ | $D_{26}$ |
|---|---|---|---|---|---|
| 1.000 | 0.7926 | 0.9640 | 1.1542 | 0.0213 | 0.0213 |
| 1.215 | 0.7016 | 0.3828 | 1.1378 | 0.3779 | 0.3533 |
| 1.480 | 0.5806 | 0.0531 | 0.9389 | 0.9385 | 0.4423 |
| 1.800 | 0.3894 | 0.1011 | 0.5166 | 1.7511 | 0.1952 |

In the projection zoom lens of Embodiment 2, the back focus distance is 2.6, and the zoom ratio is 1.8, as indicated in Table 5 above. As set forth in Table 6 below, the zoom lens of Embodiment 2 satisfies all of Conditions (1) through (6) above based on a normalized focal length of the zoom lens being unity at the wide-angle end.

TABLE 6

| Condition No. | Condition | Value |
|---|---|---|
| (1) | $2.2 \leq bf/fw \leq 5.0$ | 2.6 |
| (2) | $1.5 \leq ft/fw$ | 1.8 |
| (3) | $55 \leq \nu dA$ | 91 |
| (4), (6) | $10 < |fr/dd|, 50 < |fr/dd|$ | 169 |
| (5) | $55 \leq \nu dP$ | 95.0, 81.6 |

FIGS. 7A-7D show the spherical aberration, astigmatism, distortion, and lateral color, respectively, of the projection zoom lens of Embodiment 2 at the wide-angle end. FIGS. 8A-8D show the spherical aberration, astigmatism, distortion, and lateral color, respectively, of the projection zoom lens of Embodiment 2 at the zoom ratio of 1.215. FIGS. 9A-9D show the spherical aberration, astigmatism, distortion, and lateral color, respectively, of the projection zoom lens of Embodiment 2 at the zoom ratio of 1.480. FIGS. 10A-10D show the spherical aberration, astigmatism, distortion, and lateral color, respectively, of the projection zoom lens of Embodiment 2 at the telephoto end. As shown in these figures, the f-number varies with the zoom ratio from F/2.50 in FIG. 7A to F/3.61 in FIG. 10A and the half-field angle ω varies with the zoom ratio from 30.8° in FIGS. 7B-7D to 18.2° in FIGS. 10B-10D. In FIGS. 7A, 8A, 9A, and 10A, the spherical aberration is shown for the wavelengths 587.6 nm (the d-line), 486.1 nm (the F-line), and 656.3 nm (the C-line). In FIGS. 7B, 8B, 9B, and 10B, the astigmatism is shown for both the sagittal image surface S and the tangential image surface T. In FIGS. 7C, 8C, 9C, and 10C, distortion is measured at 587.6 nm (the d-line). In FIGS. 7D, 8D, 9D, and 10D, the lateral color is shown for the wavelengths 486.1 nm (the F-line) and 656.3 nm (the C-line) relative to 587.6 nm (the d-line). Unless otherwise noted, the aberrations are in mm.

As is evident from FIGS. 7A-10D, the projection zoom lens of Embodiment 2 enables favorable correction of aberrations, with especially excellent correction of lateral color and field curvature. In Embodiment 2, distortion is corrected to two percent or less, thereby enabling satisfactory use of Embodiment 2 as a projection zoom lens.

Moreover, the projection zoom lens of Embodiment 2 enables improved optical performance to be achieved while ensuring a large back focus distance and a high zoom ratio.

The present invention is not limited to the aforementioned embodiments, as it will be obvious that various alternative implementations are possible. Rather, the scope of the invention shall be defined as set forth in the following claims and their legal equivalents. All such modifications as would be obvious to one skilled in the art are intended to be included within the scope of the following claims.

What is claimed is:

1. A projection zoom lens having an enlarging side and a reducing side opposite the enlarging side and comprising at least two lens groups arranged from the enlarging side along an optical axis;

wherein at least two lens groups move along the optical axis during zooming;

of the lens groups that move during zooming, the lens group nearest the reducing side moves to a position closest to the enlarging side at an intermediate position of zooming between the wide-angle end and the telephoto end;

a lens group that does not move during zooming may be located on the reducing side of the lens group nearest the reducing side that moves during zooming; and the following conditions are satisfied $2.2 \leq bf/fw \leq 5.0$ $1.5 \leq ft/fw$ $55 \leq \nu dA$ $10 < |fr/dd|$ where bf is the air-equivalent distance along the optical axis between the lens surface on the reducing side of the projection zoom lens and the image plane of the projection zoom lens;

fw is the focal length of the projection zoom lens at the wide-angle end;

ft is the focal length of the projection zoom lens at the telephoto end;

vdA is determined as follows:

(a) if a lens group that does not move during zooming is located on the reducing side of the lens group nearest the reducing side that moves during zooming, then vdA is the average value of the Abbe number(s) of the lens element(s) having positive refractive power, among the lens groups that move during zooming, of the lens group that is nearest the reducing side, and the Abbe number(s) of the lens element(s) having positive refractive power of the lens group that does not move during zooming that is located on the reducing side of the lens group that moves during zooming that is nearest the reducing side; or (b) if a lens group that does not move during zooming is not located on the reducing side of the lens group nearest the reducing side that moves during zooming, then vdA is the average value of the Abbe number(s) of the lens element(s) having positive refractive power, among the lens groups that move during zooming, of the lens group that is nearest the reducing side;

fr is the focal length of the lens group that moves during zooming that is nearest the reducing side; and dd is the distance along the optical axis between the positions at the wide-angle end and at the telephoto end of the lens group that moves during zooming that is nearest the reducing side.

2. The projection zoom lens of claim 1, wherein said projection zoom lens consists of six lens groups, four of which move along the optical axis during zooming.

3. The projection zoom lens of claim 2, wherein the six lens groups are arranged in order from the enlarging side, as follows:
- a first lens group having negative refractive power and that does not move along the optical axis during zooming;
- a second lens group having positive refractive power;
- a third lens group having positive refractive power;
- a fourth lens group having positive refractive power;
- a fifth lens group; and
- a sixth lens group having positive refractive power and that does not move along the optical axis during zooming.

4. The projection zoom lens of claim 1, wherein the following condition is satisfied:

$$55 \leq vdP$$

where
(a) if a lens group that does not move during zooming is located on the reducing side of the lens group nearest the reducing side that moves during zooming, then vdP is the Abbe number of each of the lens element(s) having positive refractive power of the lens group that moves during zooming that is nearest the reducing side, and the Abbe number of each of the lens element(s) having positive refractive power of the lens group that does not move during zooming that is located on the reducing side of the lens group that moves during zooming that is nearest the reducing side; or (b) if a lens group that does not move during zooming is not located on the reducing side of the lens group nearest the reducing side that moves during zooming, then vdP is the Abbe number of each of the lens element(s) having positive refractive power of the lens group that moves during zooming that is nearest the reducing side.

5. The projection zoom lens of claim 2, wherein the following condition is satisfied:

$$55 \leq vdP$$

where
(a) if a lens group that does not move during zooming is located on the reducing side of the lens group nearest the reducing side that moves during zooming, then vdP is the Abbe number of each of the lens element(s) having positive refractive power of the lens group that moves during zooming that is nearest the reducing side, and the Abbe number of each of the lens element(s) having positive refractive power of the lens group that does not move during zooming that is located on the reducing side of the lens group that moves during zooming that is nearest the reducing side; or (b) if a lens group that does not move during zooming is not located on the reducing side of the lens group nearest the reducing side that moves during zooming, then vdP is the Abbe number of each of the lens element(s) having positive refractive power of the lens group that moves during zooming that is nearest the reducing side.

6. The projection zoom lens of claim 3, wherein the following condition is satisfied:

$$55 \leq vdP$$

where
vdP is the Abbe number of each of the lens elements having positive refractive power of the fifth lens group and the sixth lens group.

7. The projection zoom lens of claim 1, wherein the following condition is satisfied:

$$50 < |fr/dd|.$$

8. The projection zoom lens of claim 2, wherein the following condition is satisfied:

$$50 < |fr/dd|.$$

9. The projection zoom lens of claim 3, wherein the following condition is satisfied:

$$50 < |fr/dd|.$$

10. The projection zoom lens of claim 4, wherein the following condition is satisfied:

$$50 < |fr/dd|.$$

11. The projection zoom lens of claim 1, wherein the projection zoom lens is telecentric or nearly telecentric on the reducing side throughout the zoom range.

12. The projection zoom lens of claim 2, wherein the projection zoom lens is telecentric or nearly telecentric on the reducing side throughout the zoom range.

13. The projection zoom lens of claim 3, wherein the projection zoom lens is telecentric or nearly telecentric on the reducing side throughout the zoom range.

14. The projection zoom lens of claim 4, wherein the projection zoom lens is telecentric or nearly telecentric on the reducing side throughout the zoom range.

15. The projection zoom lens of claim 7, wherein the projection zoom lens is telecentric or nearly telecentric on the reducing side throughout the zoom range.

16. A projection display device including the projection zoom lens of claim 1 and a light source providing a light beam that is guided by an illumination optical system through at least one light valve that modulates the light beam before the light beam passes through the projection zoom lens and is projected onto a screen.

17. A projection display device including the projection zoom lens of claim 2 and a light source providing a light beam that is guided by an illumination optical system through at least one light valve that modulates the light beam before the light beam passes through the projection zoom lens and is projected onto a screen.

18. A projection display device including the projection zoom lens of claim 3 and a light source providing a light beam that is guided by an illumination optical system through at least one light valve that modulates the light beam before the light beam passes through the projection zoom lens and is projected onto a screen.

19. A projection display device including the projection zoom lens of claim 4 and a light source providing a light beam that is guided by an illumination optical system through at least one light valve that modulates the light beam before the light beam passes through the projection zoom lens and is projected onto a screen.

20. A projection display device including the projection zoom lens of claim 7 and a light source providing a light beam that is guided by an illumination optical system through at least one light valve that modulates the light beam before the light beam passes through the projection zoom lens and is projected onto a screen.

* * * * *

UNITED STATES PATENT AND TRADEMARK OFFICE
CERTIFICATE OF CORRECTION

| | | |
|---|---|---|
| PATENT NO. | : 7,359,126 B2 | Page 1 of 1 |
| APPLICATION NO. | : 11/723777 | |
| DATED | : April 15, 2008 | |
| INVENTOR(S) | : Yamamoto | |

It is certified that error appears in the above-identified patent and that said Letters Patent is hereby corrected as shown below:

Column 6
Line 9, change "50<|fr/dd" to -- 50<|fr/dd| --.

Signed and Sealed this

Twenty-second Day of July, 2008

JON W. DUDAS
*Director of the United States Patent and Trademark Office*